No. 612,549. Patented Oct. 18, 1898.
H. E. RIDER.
WAVE POWER UTILIZING DEVICE.
(Application filed Jan. 20, 1898.)
(No Model.) 3 Sheets—Sheet 2.
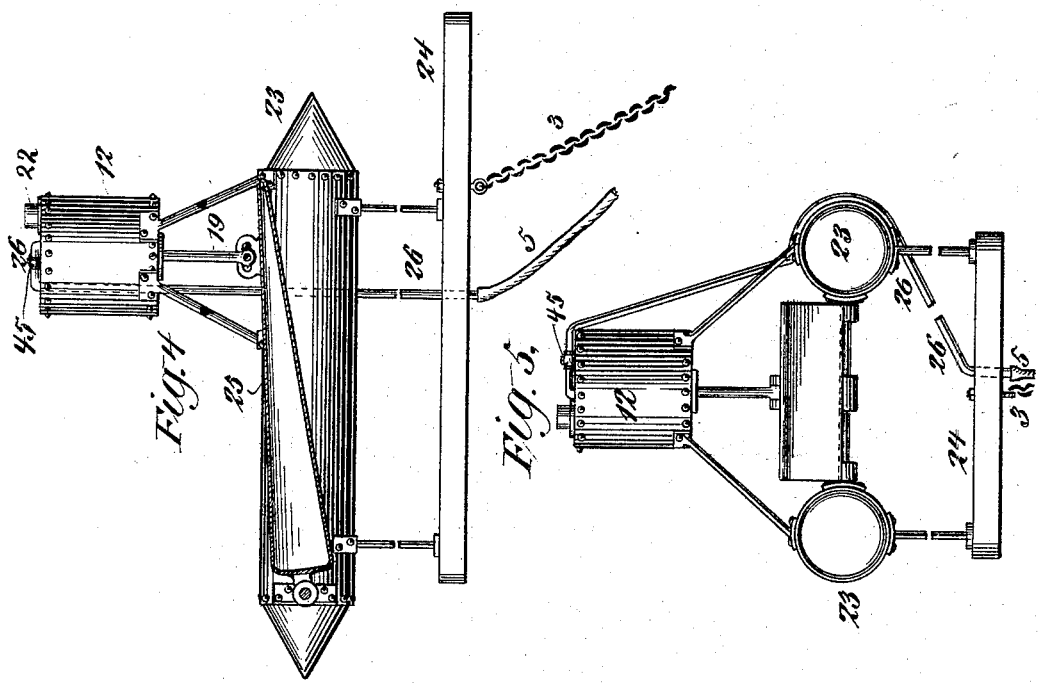
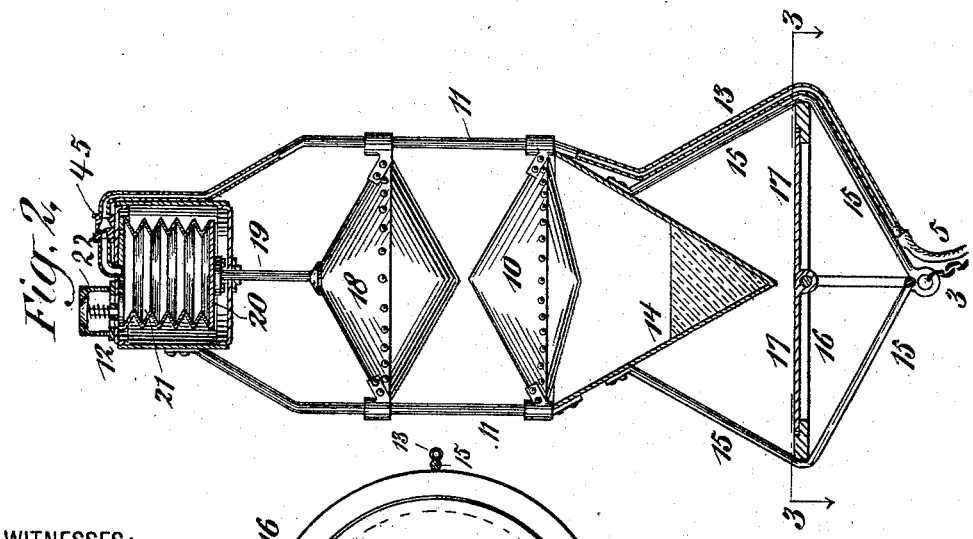
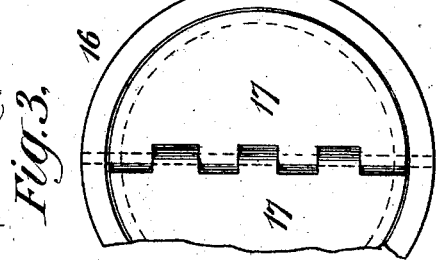
WITNESSES:
INVENTOR
Herbert E. Rider
BY
Henry D. Williams
ATTORNEY No. 612,549. Patented Oct. 18, 1898.
H. E. RIDER.
WAVE POWER UTILIZING DEVICE.
(Application filed Jan. 20, 1898.)
(No Model.) 3 Sheets—Sheet 3.
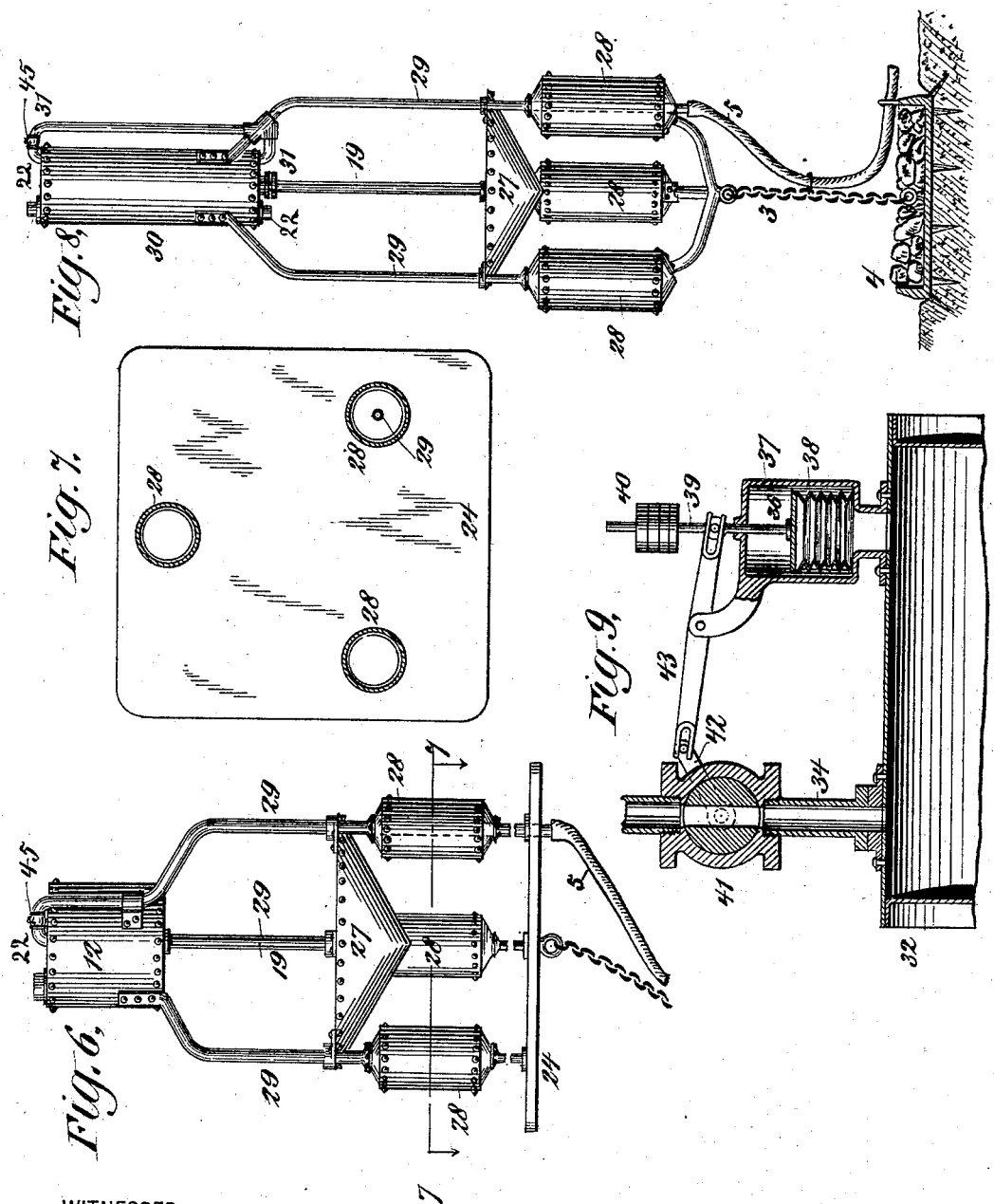
WITNESSES:
INVENTOR
Herbert E. Rider
BY
Henry D. Williams
ATTORNEY

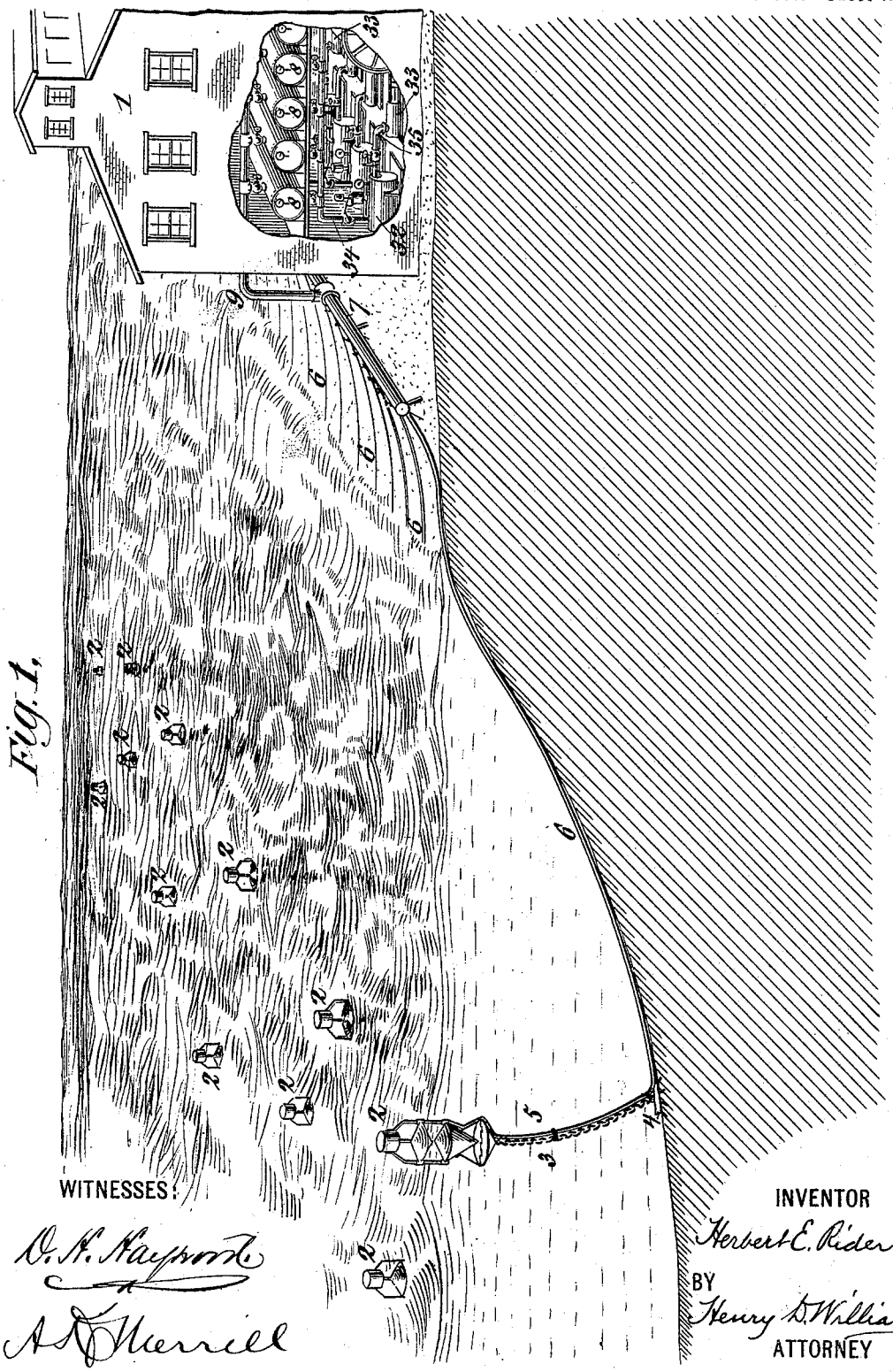

UNITED STATES PATENT OFFICE.

HERBERT E. RIDER, OF NEW YORK, N. Y., ASSIGNOR, BY MESNE ASSIGNMENTS, TO THE OCEAN POWER COMPANY, OF SAME PLACE.

WAVE-POWER-UTILIZING DEVICE.

SPECIFICATION forming part of Letters Patent No. 612,549, dated October 18, 1898.

Application filed January 20, 1898. Serial No. 667,185. (No model.)

*To all whom it may concern:*

Be it known that I, HERBERT E. RIDER, a citizen of the United States, and a resident of the city of New York, in the county of New York and State of New York, have invented certain new and useful Improvements in Wave-Power-Utilizing Devices, of which the following is a specification, reference being had to the accompanying drawings, forming part hereof.

This invention relates to means for utilizing the power of the waves of the ocean and other bodies of water.

One of the objects of my invention is to provide power-collecting means capable of withstanding storms and unusually heavy seas, and therefore practically indestructible by the elements; and to this end I employ as the power-collecting devices floating structures flexibly connected with fixed bodies beneath the surface of the water, as buoys moored to anchors, so that there are no rigid or immovable parts above the surface or exposed to the action of the waves.

Another object of my invention is to provide for the effective utilization of the motions of the wave particles in substantially all phases of their motion. The individual particles composing the waves move in elliptical paths, and in deep water the ellipses traversed by the particles are substantially circles. The power-collecting devices embodying my invention contain parts constructed to move relatively to each other under the action of the waves in a substantially vertical direction, but are provided with inclined surfaces, so that the vertical rise and fall of the parts is augmented by the pressures against these inclined surfaces of the wave particles due to their motions in other than the vertical direction.

Another object of my invention is to provide for the transformation or utilization of the power at a station, which may be on land; and to this end my invention contemplates the employment of a fluid-compressing device on a floating structure, moored as above described, and a flexible conduit from the fluid-compressing device to the anchor or fixed body substantially parallel to the flexible connection, and thence connected to the power-station.

My invention also contemplates the employment of a number of floating structures separately moored and provided with fluid-compressing devices and flexible conduits, as above described, the several conduits being connected to a single power-station, and thus the power concentrated at the station may be collected over an extended surface and great power may be developed, limited only by the number of floating structures employed.

My invention also includes various improvements in construction, all of which will now be particularly described with reference to the accompanying drawings, forming part hereof.

Figure 1 is a sectional perspective view showing a number of power-collecting devices connected to a power-station on land. Fig. 2 is a vertical sectional elevation of one of the power-collecting devices shown in Fig. 1. Fig. 3 is a horizontal section of the same on line 3 3, Fig. 2. Fig. 4 is a longitudinal vertical section of a modified form of power-collecting device. Fig. 5 is an end elevation of the same. Fig. 6 is a side elevation of another modified form of power-collecting device. Fig. 7 is a horizontal section of the same on the line 7 7, Fig. 6. Fig. 8 is a side elevation of another modified form of power-collecting device adapted for shallow water. Fig. 9 is an enlarged longitudinal vertical section of a portion of a secondary reservoir and a pressure-regulator at the power-station.

The number of power-collecting devices employed will depend upon the amount of power required. Fig. 1 shows a power-station 1, constructed for the development of considerable power, and a number of power-collecting devices 2 are shown. These power-collecting devices are separately moored or flexibly connected with fixed bodies, as anchors beneath the surface of the water, and are moored or anchored at suitable distances from each other, so that each power-collecting device is separately actuated by the motion of the waves in its vicinity. Each power-collecting device is connected to the power-station, so that the power collected over an extended surface is conveyed to and concentrated at the power-station. I propose to employ pneumatic power collecting and utilizing and transforming devices, and such devices are shown. The mooring and connections of one power-collecting device are completely shown in Fig. 1, the power-collecting device being connected by a flexible connection, (shown as a chain 3,) with a fixed body (shown as a heavy plate or anchor 4) resting on the bottom and having projections or flukes to prevent shifting or sliding. A flexible conduit or pipe 5 extends from the power-collecting device to the fixed body or anchor substantially parallel to the flexible connection, cable, or chain 3, and may have loops at intervals engaging such chain or cable, if desired, as shown, or may be otherwise held substantially parallel to the cable or chain, so that the strain of the float is sustained by the cable or chain in all positions of the float. The flexible pipe 5 may be continued from the anchor to the shore by the part 6, as shown, or a rigid conduit or pipe connected to it and extended to the shore. As shown, the separate pipes 6 for each power-collecting device 2 run into a larger common conduit or pipe 7, which is connected by a pipe 9, entering the power-station 1, to the reservoirs or storage-tanks 8 in the power-station.

I will now describe the power-collecting devices. Several modified constructions embodying this part of the invention are shown in the drawings, each of which is a floating structure, made up primarily of two parts, a surface floating part constructed to float on the surface of the water and a part extending some distance below the surface of the water. The latter part is moored to the anchor and includes a sustaining buoyant part or pontoon and an air-compressing cylinder.

In the construction shown in Figs. 1, 2, and 3 the sustaining buoyant part is a water-tight hollow pontoon 10, having a conical upper surface, so as to present a downwardly-inclined surface to the waves, and a lower surface slightly conical or nearly flat. Pipes or tubes 11 11 extend upward from the pontoon 10 to the air-compressing cylinder 12, and the right-hand pipe 11 is utilized as a conduit to convey compressed air from the cylinder 12, being extended over and opening into the top of such cylinder and being continued by the part 13 downward below the pontoon 10 and having the flexible tube 5 secured to its lower end. An open-top funnel-shaped part 14 is arranged immediately below the pontoon 10 and is suitably weighted at its lower end, and rods 15 15 extend downward from the funnel-shaped part 14 over a resistance-table 16 and unite in an eye to which the anchor-chain 3 is secured. The resistance-table is provided with upwardly-yielding portions, (shown as two medially-hinged leaves 17 17,) which move upwardly, so as not to resist a downward movement of this part of the floating structure, but close on upward movement thereof and resist such movement.

The surface floating part, as shown in the drawings, comprises a float, a piston, and a rod connecting the float and piston. In the construction shown in Figs. 1, 2, and 3 the hollow float 18 has a conical lower surface, so as to present an upwardly-inclined surface to the waves, and its upper surface is shown as conical, although it may be otherwise shaped and is shown as flat in the modified constructions. The piston-rod 19 extends upward from the float 18 into the air-compressing cylinder 12, and a piston 20 is secured at the upper end of the piston-rod 19; but this piston may be, as shown, smaller in diameter than the bore of the cylinder, and a flexible bellows-like envelop 21 is secured at its lower end to this piston 20 and is secured at its upper end to the top of the cylinder, so as to be air-tight. An induction-valve 22 is located at the top of the cylinder and an eduction-valve 45 is in the conduit 11. This device is substantially a bellows inclosed within a cylinder for protection and does not require any tight-fitting sliding parts, as would be necessary with an ordinary cylinder and piston for compressing air.

In the modified construction shown in Figs. 4 and 5 the buoyant or sustaining portions of the part extending below the surface of the water are shown in the form of two horizontally-arranged pontoons 23 23 of cylindrical form and rods extending downwardly from these cylinders 23 to a resistance-table 24, which will be submerged a considerable distance below the surface of the water, so as to be in a stratum of water unaffected or but slightly affected by the motion of the waves. The air-compressing cylinder 12 is sustained above the space between the buoyant cylinders 23 and may be of the same construction as the corresponding air-compressing cylinder shown in Figs. 1 and 2, and the air compressed therein is conveyed through the pipe 26 downwardly to a point just below the resistance-table 24, and there the flexible conduit 5 is connected to the pipe 26. The surface floating part comprises a float 25, pivoted at one end to the buoyant cylinders 23 and arranged in the space between these buoyant cylinders and provided with a piston-rod extending up into the air-compressing cylinder 12. The lower surface of the float 25 is oblique or inclined, so as to present an upwardly-inclined surface in one direction to the waves, and this construction of power-collecting devices should be moored so as to always face the waves. To this end the anchor-chain 3 is secured to the resistance-table near the front end thereof. In some instances it may be advisable to provide an additional anchor-chain to hold the floating structure in desired position.

In the modified construction shown in Figs. 6 and 7 the buoyant or sustaining portion comprises three vertically-arranged cylinders or pontoons 28, from which three vertical tubes 29 extend upwardly to the air-compressing cylinder 12. The right-hand one of these tubes acts as the compressed-air conduit. Similar tubes extend downwardly from the pontoons 28 to the resistance-table 24, and the flexible conduit 5 is connected to the right-hand one of the vertical tubes just below the resistance-table. The anchor-chain is connected to the resistance-table. The surface float 27 slides vertically upon the tubes 29 and has a piston-rod 19 extending up into the air-compressing cylinder and actuating a piston therein.

The floating structures or power-collectors heretofore described are adapted for deep water, each containing parts which will be submerged a considerable distance below the surface. When the water is so shallow that such devices may not be used, a construction such as is shown in Fig. 8 may be employed. This construction resembles that shown in Figs. 6 and 7, having similar vertically-arranged pontoons 28; but the resistance-table is omitted and the anchor-chain 3 is quite short by reason of the shallowness of the water and is arranged to exert sufficient tension upon the floating structure against the buoyancy thereof to hold the structure substantially upright at all conditions of the tide. To provide for the rise and fall of the tide, the air-compressing cylinder is of considerable length, so as to accommodate the extreme high position of the float 27 at high water and the extreme low position of the float 27 at low water; or the length may be such as to provide only for the average wave motion at high and low water if it is not desired to utilize the excess of wave movement above the average when the waves are running unusually high. The air-compressing cylinder 30 has air-conduits 31 31 extending from each end and is provided with induction-valves at each end, so as to be double acting—i. e., to utilize both the upward and downward movements of the surface float 27 in the compression of air.

The pontoons and floats may be made of boiler-iron or steel and all parts of the floating structures may be made hollow, the side rods not used as conduits being preferably of tubing and closed or inclosed at their ends, so as to form air-chambers.

In all of the constructions of power-collecting devices above described the surface floating part presents an upwardly-inclined surface to the waves. The movement of each particle of water composing the waves is both upward and downward and backward and forward or in an elliptical or substantially circular path or orbit, and it is designed by this construction to utilize the motion of the wave particles in all directions. The upward and downward movements of the wave particles cause the surface floats to rise and fall; but this movement is augmented by the pressures of the wave particles against the inclined lower surfaces of the surface floats, which are resolved into pressures in the direction of movement of the float. In all constructions except that shown in Figs. 4 and 5 these lower surfaces of the surface floats are of conical form, and it is therefore unnecessary to hold the floating structures in any particular position; but in the construction shown in Figs. 4 and 5 the inclination of the lower surface of the surface float is in but one direction, and the floating structure must therefore be held to face the waves, as above described.

In the construction shown in Figs. 1, 2, and 3 the upper surface of the pontoon 10 is conical, so that the pontoon presents a downwardly-inclined surface to the waves, and thus the movement of the wave that augments the upward movement of the surface float 18 will drive the pontoon and connected parts downward, and thus cause a downward movement of the cylinder and a further relative movement of the parts. The funnel-shaped part 14 will offer little resistance to this downward movement, and the leaves 17 of the resistance-table 16 will yield upwardly, so as not to resist this downward movement, while, on the other hand, any tendency to upward movement of the pontoon will cause downward pressure on the leaves and will thus encounter the full resisting-surface of the resistance-table.

At the power-station (see Fig. 1) the air-reservoirs 8, which, as above described, receive the compressed air from the several power-collecting devices, are connected by suitable conduits or pipes 34 to air-reservoirs 32, from which the air is conveyed by suitable conduits or pipes 35 to pneumatic engines 33, which are driven by the compressed air. The first set of air-reservoirs 8 I designate as "primary" reservoirs and the second set 32 as "secondary" reservoirs. Pressure-regulators, one of which is shown enlarged and in section in Fig. 9, are actuated by the pressures of air in the respective secondary reservoirs to regulate and control the pressure of air in the secondary reservoirs, so that the air is supplied to the engines at substantially uniform pressures. Each pressure-regulator comprises a movable part actuated by the pressure in the secondary reservoir and resisting such pressure and a valve controlling the flow of air from the primary to the secondary reservoir. The movable part is shown as the weighted piston 36 within the cylinder 37, the cylinder being secured to the secondary reservoir and opening at its lower end therein. The piston 36 is of smaller diameter than the bore of the cylinder, and a flexible envelop 38 is secured at its upper end to the piston and at its lower end to the cylinder in an air-tight manner, and the device acts as a bellows, the flexible envelop 38 permitting the piston to rise and fall under the pressure of the air and no air-tight sliding joints being necessary. A rod 39 extends upward from the piston 36 and out through the upper end of the cylinder, and weights 40 are secured to its upper end, whereby the piston is loaded to resist air-pressure. The valve controlling the flow of air from the primary reservoir to the secondary reservoir is shown as an oscillating valve 41, located in the conduit 34 and provided with an arm 42, which engages the left-hand end of a pivoted rock-lever 43, and the right-hand end of the rock-lever 43 engages the rod 39 of the piston 36. As shown, the valve 41 is wide open and the piston 36 is in lower position. The increase of pressure in the secondary reservoir 32 will cause the piston 36 to be raised, and this will cause the valve-arm 42 to move downwardly and partially or wholly close the valve, depending upon the amount of increased pressure, and upon a following diminution of the pressure in the secondary reservoir the piston will move downwardly and the valve will be opened. The normal pressure in the secondary reservoir may be regulated by varying the weight with which the piston 36 is loaded, and this having been properly adjusted the slightest increase above the normal pressure will cause a restriction of the valve-opening, and thus material increase above the normal pressure in the secondary reservoir will be prevented.

The power developed by the power-collectors according to my invention will be variable, depending upon the amplitude of wave motion. The number of power-collecting devices may be such as to supply to the pneumatic engines sufficient air at normal pressure under minimum amplitude of wave motion, or the normal pressure may be that maintained under the average of the usual variable conditions, the air being accumulated or stored in the primary reservoirs or other storage-reservoirs when the wave movement is above the average and automatically drawn therefrom in excess of the supply thereto into the secondary reservoirs under the action of the pressure-regulators when the wave movement is below the average. The amount of power concentrated at any set of primary reservoirs may also be regulated by varying the number of power-collectors connected thereto, and reserve power-collectors may be provided, if desired, normally disconnected, which may be connected to the primary reservoirs whenever necessary, as by reason of a diminution of wave motion or breakage of a connected wave-collector.

It is proposed to operate the plant at comparatively low air-pressures, large air-reservoirs and engines of large surface being employed. As the power developed is limited only by the number of collecting devices employed the number of these floating structures will be determined by the amount of power desired. Dynamo-electric machines may be actuated by the pneumatic engines and the energy of motion thus transformed into electric energy, and this electric energy may be conveyed by conductors to towns or cities or other places at which it is desired to utilize the energy and may be utilized for light, heat, or power, or in any manner desired.

In some instances it may be desired to employ some other fluid than air to be compressed at the power-collectors or pumped by the power-collectors and conveyed to a power-station and utilized or transformed into other forms of energy. So, also, various modifications may be made in the constructions above particularly described within the purview of my invention.

What I claim, and desire to secure by Letters Patent, is—

1. Means for utilizing the power of waves comprising a floating structure flexibly connected to a fixed body beneath the surface of the water, said floating structure including two parts constructed to be moved relatively to each other by the action of the waves, one of said parts being constructed to float upon the surface of the water and having an inclined lower surface whereby it presents an upwardly-inclined surface to the waves, and the other of said parts having an oppositely-inclined surface whereby it presents a downwardly-inclined surface to the waves, substantially as set forth.

2. Means for utilizing the power of waves comprising a floating structure flexibly connected to a fixed body beneath the surface of the water, said floating structure including two parts constructed to be moved relatively to each other by the action of the waves, one of said parts being constructed to float upon the surface of the water and having an inclined lower surface whereby it presents an upwardly-inclined surface to the waves and the other of said parts being constructed to extend below the surface of the water and having an oppositely-inclined surface whereby it presents a downwardly-inclined surface to the waves, substantially as set forth.

3. Means for utilizing the power of waves comprising a floating structure flexibly connected to a fixed body beneath the surface of the water, said floating structure including two parts constructed to be moved relatively to each other by the action of the waves, one of said parts being constructed to float upon the surface of the water and having an inclined lower surface whereby it presents an upwardly-inclined surface to the waves and the other of said parts an oppositely-inclined surface whereby it presents a downwardly-inclined surface to the waves, and a fluid-compressing device connected to said movable parts, substantially as set forth.

4. Means for utilizing the power of waves comprising a floating structure flexibly connected to a fixed body beneath the surface of the water, said floating structure including two parts constructed to be moved relatively to each other by the action of the waves, one of said parts being constructed to float upon the surface of the water and having an inclined lower surface whereby it presents an upwardly-inclined surface to the waves and the other of said parts being beneath said surface float and having an oppositely-inclined surface whereby it presents a downwardly-inclined surface to the waves, and a fluid-compressing device connected to said movable parts, substantially as set forth.

5. Means for utilizing the power of waves comprising a floating structure flexibly connected to a fixed body beneath the surface of the water, said floating structure including a part constructed to float upon the surface of the waves and having an inclined lower surface whereby it presents an upwardly-inclined surface to the waves and a part constructed to be submerged a considerable distance below the surface of the waves and including a resistance-table having one or more upwardly-yielding portions, said parts being movable relatively to each other, and a fluid-compressing device constructed to be actuated by the relative movements of said parts, substantially as set forth.

6. Means for utilizing the power of waves comprising a floating structure flexibly connected to a fixed body beneath the surface of the water, said floating structure including a part constructed to float upon the surface of the waves and a part constructed to be submerged a considerable distance below the surface of the waves, said parts being movable relatively to each other, a fluid-compressing device constructed to be actuated by the relative movements of such parts, and a flexible conduit extending from the compressing device to the fixed body substantially parallel to the flexible connection and thence connected to a power-station, substantially as set forth.

7. Means for utilizing the power of waves comprising a floating structure flexibly connected to a fixed body beneath the surface of the water, said floating structure including two parts constructed to be moved relatively to each other by the action of the waves and one of said parts constructed to float upon the surface of the waves and having an inclined lower surface whereby it presents an upwardly-inclined surface to the waves, a fluid-compressing device constructed to be actuated by the relative movements of such parts, and a flexible conduit extending from the compressing device to the fixed body substantially parallel to the flexible connection and thence connected to a power-station, substantially as set forth.

8. Means for utilizing the power of waves comprising a floating structure flexibly connected to a fixed body beneath the surface of the water, said floating structure including two parts constructed to be moved relatively to each other by the action of the waves, one of said parts being constructed to float upon the surface of the waves and having an inclined lower surface whereby it presents an upwardly-inclined surface to the waves, and the other of said parts having an oppositely-inclined surface whereby it presents a downwardly-inclined surface to the waves, a fluid-compressing device constructed to be actuated by the relative movements of such parts, and a flexible conduit extending from the compressing device to the fixed body substantially parallel to the flexible connection and thence connected to a power-station, substantially as described.

9. Means for utilizing the power of waves comprising a floating structure flexibly connected to a fixed body beneath the surface of the water, said floating structure including two parts constructed to be moved relatively to each other by the action of the waves, one of said parts being constructed to float upon the surface of the water and having an inclined lower surface whereby it presents an upwardly-inclined surface to the waves and the other of said parts being beneath said surface float and having an oppositely-inclined surface whereby it presents a downwardly-inclined surface to the waves, a fluid-compressing device constructed to be actuated by the relative movements of such parts, and a flexible conduit extending from the compressing device to the fixed body substantially parallel to the flexible connection and thence connected to a power-station, substantially as set forth.

10. Means for utilizing the power of waves comprising a plurality of floating structures flexibly connected to fixed bodies beneath the surface of the water, each floating structure including parts constructed to be moved relatively to one another by the action of the waves and a fluid-compressing device actuated by the relative movements of such parts, flexible conduits extending from each compressing device to the respective fixed body substantially parallel to the flexible connection, and a reservoir for compressed fluid to which said conduits are connected, substantially as set forth.

11. Means for utilizing the power of waves comprising a plurality of floating structures, flexibly connected to fixed bodies beneath the surface of the water, each floating structure including a part constructed to float upon the surface of the waves and a part constructed to be submerged a considerable distance below the surface of the waves, said parts being movable relatively to each other, and each floating structure having a fluid-compressing device constructed to be actuated by the relative movements of the parts of the floating structure, flexible conduits extending from each compressing device to the respective fixed body substantially parallel to the flexible connection, and a reservoir for compressed fluid to which said conduits are connected, substantially as set forth.

12. Means for utilizing the power of waves comprising a plurality of floating structures flexibly connected to fixed bodies beneath the surface of the water each floating structure including two parts constructed to be moved relatively to each other by the action of the waves and one of said parts constructed to float upon the surface of the waves and having an inclined lower surface whereby it presents an upwardly-inclined surface to the waves, and each floating structure having a fluid-compressing device constructed to be actuated by the relative movements of the parts of the floating structure, flexible conduits extending from each compressing device to the respective fixed body substantially parallel to the flexible connection, and a reservoir for compressed fluid to which said conduits are connected, substantially as set forth.

13. Means for utilizing the power of waves comprising a plurality of floating structures flexibly connected to fixed bodies beneath the surface of the water, each floating structure including two parts constructed to be moved relatively to each other by the action of the waves, one of said parts being constructed to float upon the surface of the waves and having an inclined lower surface whereby it presents an upwardly-inclined surface to the waves, and the other of said parts having an oppositely-inclined surface whereby it presents a downwardly-inclined surface to the waves, and each floating structure having a fluid-compressing device constructed to be actuated by the relative movements of the parts of the floating structure, flexible conduits extending from each compressing device to the respective fixed body substantially parallel to the flexible connection, and a reservoir for compressed fluid to which said conduits are connected, substantially as set forth.

14. Means for utilizing the power of waves comprising a plurality of floating structures flexibly connected to fixed bodies beneath the surface of the water, each floating structure including two parts constructed to be moved relatively to each other by the action of the waves, one of said parts being constructed to float upon the surface of the waves and having an inclined lower surface whereby it presents an upwardly-inclined surface to the waves and the other of said parts being beneath said surface float and having an oppositely-inclined surface whereby it presents a downwardly-inclined surface to the waves, and each floating structure having a fluid-compressing device constructed to be actuated by the relative movements of the parts of the floating structure, flexible conduits extending from each compressing device to the respective fixed body substantially parallel to the flexible connection, and a reservoir for compressed fluid to which said conduits are connected, substantially as set forth.

15. A floating structure for utilizing the power of waves having two parts constructed to be moved relatively to each other by the action of the waves, one of said parts being constructed to float upon the surface of the water and having an inclined lower surface whereby it presents an upwardly-inclined surface to the waves, and the other of said parts having an oppositely-inclined surface whereby it presents a downwardly-inclined surface to the waves, substantially as set forth.

16. A floating structure for utilizing the power of waves having two parts constructed to be moved relatively to each other by the action of the waves, one of said parts being constructed to float upon the surface of the water and having an inclined lower surface whereby it presents an upwardly-inclined surface to the waves and the other of said parts being beneath said surface float and having an oppositely-inclined surface whereby it presents a downwardly-inclined surface to the waves, substantially as set forth.

17. A floating structure for utilizing the power of waves having two parts constructed to be moved relatively to each other by the action of the waves, one of said parts being constructed to float upon the surface of the water and having an inclined lower surface whereby it presents an upwardly-inclined surface to the waves and the other of said parts having a resistance-table constructed to be submerged a considerable distance below the surface of the waves, and one or more upwardly-yielding portions in said resistance-table and an inclined surface constructed to present a downwardly-inclined surface to the waves, substantially as set forth.

18. A floating structure for utilizing the power of waves having two parts constructed to be moved relatively to each other by the action of the waves, one of said parts being constructed to float upon the surface of the water and the other of said parts having one or more upwardly-yielding portions constructed to be submerged a considerable distance below the surface of the waves and having an inclined surface constructed to present a downwardly-inclined surface to the waves, substantially as set forth.

19. A floating structure for utilizing the power of waves having two parts constructed to be moved relatively to each other by the action of the waves, one of said parts being constructed to float upon the surface of the water and having an inclined lower surface whereby it presents an upwardly-inclined surface to the waves and the other of said parts having one or more upwardly-yielding portions constructed to be submerged a considerable distance below the surface of the waves, and having an inclined surface constructed to present a downwardly-inclined surface to the waves, substantially as set forth.

20. A floating structure for utilizing the power of waves having two parts constructed to be moved relatively to each other by the action of the waves, one of said parts being constructed to float upon the surface of the water and having a substantially conical lower surface and the other of said parts having a substantially conical upper surface beneath said surface float, substantially as set forth.

21. A floating structure for utilizing the power of waves having two parts constructed to be moved relatively to each other by the action of the waves, one of said parts being constructed to float upon the surface of the water and having a substantially conical lower surface and the other of said parts having a resistance-table with one or more upwardly-yielding portions constructed to be submerged a considerable distance below the surface of the waves, and an air-pump constructed to be actuated by the relative movements of such parts, substantially as set forth.

22. A floating structure for utilizing the power of waves having two parts constructed to be moved relatively to each other by the action of the waves, one of said parts being constructed to float upon the surface of the water and the other of said parts having a substantially conical upper surface beneath said surface float, substantially as set forth.

23. A floating structure for utilizing the power of waves having two parts constructed to be moved relatively to each other by the action of the waves, one of said parts being constructed to float upon the surface of the water and having a substantially conical lower surface and the other of said parts having a substantially conical upper surface beneath said surface float and having a resistance-table with one or more upwardly-yielding portions constructed to be submerged a considerable distance below the surface of the waves, substantially as set forth.

24. A floating structure for utilizing the power of waves comprising a surface float and a part constructed to extend below the surface of the water, and an air-compressing device actuated by the relative movements of such parts and comprising a cylinder on one of such parts, a piston on the other of such parts, the piston being smaller than the bore of the cylinder, and a flexible envelop secured air-tight to the piston and to the cylinder, an induction-valve leading to the space within such envelop and a conduit leading out from such space, substantially as set forth.

25. A floating structure for utilizing the power of waves having two parts constructed to be moved relatively to each other by the action of the waves, one of said parts being constructed to float upon the surface of the water and having a substantially conical lower surface and the other of said parts having a pontoon with a substantially conical upper surface beneath said surface float, a downwardly-extending funnel-shaped part beneath said pontoon, and a resistance-table with one or more upwardly-yielding portions beneath said funnel-shaped part, substantially as set forth.

26. In a floating structure for utilizing the power of waves, the combination with a part constructed to extend below the surface of the water and having guide-rods extending upwardly and a cylinder 12 at the upper end thereof, of a float sliding upon said guide-rods, a rod 19 extending upwardly therefrom into said cylinder, the piston 20, the flexible envelop 21, an induction-valve leading into the space within said envelop and a conduit leading out therefrom, substantially as set forth.

27. In a floating structure for utilizing the power of waves, the combination with a part constructed to extend below the surface of the water and having guide-rods extending upwardly and a cylinder 12 at the upper end thereof, and having the pontoon 10 and the funnel-shaped part 14, and rods extending downwardly therefrom and the resistance-table 16 having leaves 17, of a float sliding upon said guide-rods, a rod 19 extending upwardly therefrom into said cylinder, the piston 20, the flexible envelop 21, an induction-valve leading into the space within said envelop and a conduit leading out therefrom, substantially as set forth.

28. In a floating structure for utilizing the power of waves, the combination of the pontoon 10, guide-rods extending upwardly therefrom, the cylinder 12 at the upper end of the guide-rods, the funnel-shaped part 14, rods extending downwardly therefrom, the resistance-table 16 having leaves 17, means for mooring said structure connected thereto below the resistance-table, the float 18, the rod 19 extending upwardly therefrom into the cylinder, the piston 20, the flexible envelop 21, an induction-valve leading into the space within said envelop and a conduit leading out therefrom, said conduit extending downwardly into proximity to the point of mooring, substantially as set forth.

Signed at the city of New York, in the county of New York and State of New York, this 18th day of January, A. D. 1898.

HERBERT E. RIDER.

Witnesses:
  HENRY D. WILLIAMS,
  HERBERT H. GIBBS.